United States Patent
Al Hasan et al.

(10) Patent No.: US 11,068,660 B2
(45) Date of Patent: Jul. 20, 2021

(54) SYSTEMS AND METHODS FOR NEURAL CLINICAL PARAPHRASE GENERATION

(71) Applicant: KONINKLIJKE PHILIPS N.V., Eindhoven (NL)

(72) Inventors: Sheikh Sadid Al Hasan, Cambridge, MA (US); Bo Liu, Cambridge, MA (US); Oladimeji Feyisetan Farri, Yorktown Heights, NY (US); Junyi Liu, Windham, NH (US); Aaditya Prakash, Waltham, MA (US)

(73) Assignee: Koninklijke Philips N.V., Eindhoven (NL)

( * ) Notice: Subject to any disclaimer, the term of this patent is extended or adjusted under 35 U.S.C. 154(b) by 168 days.

(21) Appl. No.: 16/072,128

(22) PCT Filed: Jan. 23, 2017

(86) PCT No.: PCT/IB2017/050325
§ 371 (c)(1),
(2) Date: Jul. 23, 2018

(87) PCT Pub. No.: WO2017/130089
PCT Pub. Date: Aug. 3, 2017

(65) Prior Publication Data
US 2019/0034416 A1 Jan. 31, 2019

Related U.S. Application Data

(60) Provisional application No. 62/286,989, filed on Jan. 26, 2016.

(51) Int. Cl.
*G06F 40/30* (2020.01)
*G06N 3/04* (2006.01)
(Continued)

(52) U.S. Cl.
CPC ............ *G06F 40/30* (2020.01); *G06F 40/247* (2020.01); *G06F 40/56* (2020.01); *G06N 3/0445* (2013.01);
(Continued)

(58) Field of Classification Search
CPC ........ G06F 40/30; G06F 40/26; G06F 40/247; G06F 16/2475; G06N 3/02; G06N 3/0445; G06N 3/0454; G06N 3/08; G06N 5/02
See application file for complete search history.

(56) References Cited

U.S. PATENT DOCUMENTS 8,219,724 B1 * 7/2012 Caruso ................. G06F 3/0604
710/36
9,753,618 B1 * 9/2017 Jain ........................ G06F 8/61
(Continued)

OTHER PUBLICATIONS

Peled et al., Semantic Locality and Context-based Prefetching Using Reinforcement Learning, Israel Institute of Technology, pp. 285-296 (Year: 2015).*
(Continued)

*Primary Examiner* — Jakieda R Jackson

(57) ABSTRACT

The present disclosure pertains to a paraphrase generation system. The system comprises one or more hardware processors and/or other components. The system is configured to obtain a training corpus. The training corpus comprises language and known paraphrases of the language. The system is configured to generate, based on the training corpus, a word-level attention-based model and a character-level attention-based model. The system is configured to provide one or more candidate paraphrases of a natural language input based on both the word-level and character-level attention-based models. The word-level attention-based model is a word-level bidirectional long short term memory (LSTM) network and the character-level attention-(Continued)

based model is a character-level bidirectional LSTM network. The word-level and character level LSTM networks are generated based on words and characters in the training corpus. In some embodiments, the LSTM networks are stacked residual LSTM networks comprising residual connections between stacked layers of a given LSTM network.

21 Claims, 6 Drawing Sheets

(51) Int. Cl.
*G06N 3/08* (2006.01)
*G06F 40/56* (2020.01)
*G06F 40/247* (2020.01)
*G06N 5/02* (2006.01)

(52) U.S. Cl.
CPC ............. *G06N 3/0454* (2013.01); *G06N 3/08* (2013.01); *G06N 5/02* (2013.01)

(56) References Cited

U.S. PATENT DOCUMENTS

| | | | | |
|---|---|---|---|---|
| 10,115,055 | B2* | 10/2018 | Weiss | G06F 40/30 |
| 2005/0022114 | A1* | 1/2005 | Shanahan | G06F 16/93 |
| | | | | 715/234 |
| 2010/0088331 | A1* | 4/2010 | White | G06F 16/24578 |
| | | | | 707/759 |
| 2010/0121936 | A1* | 5/2010 | Liu | H04N 5/44543 |
| | | | | 709/217 |
| 2011/0314003 | A1* | 12/2011 | Ju | G10L 15/1822 |
| | | | | 707/723 |
| 2013/0103390 | A1* | 4/2013 | Fujita | G06F 40/279 |
| | | | | 704/9 |
| 2014/0358519 | A1* | 12/2014 | Mirkin | G06F 40/44 |
| | | | | 704/3 |
| 2015/0248608 | A1* | 9/2015 | Higgins | G06N 3/08 |
| | | | | 706/16 |
| 2016/0111108 | A1* | 4/2016 | Erdogan | G10L 21/0216 |
| | | | | 704/202 |
| 2017/0154258 | A1* | 6/2017 | Liu | G06N 3/0445 |

OTHER PUBLICATIONS

Zhang et al. "Character-level Convolution Networks for Text Classification", 2015, pp. 1-3 (Year: 2015).*
Nakov, et al., "Combining Word-Level and Character-Level Models for Machine Translation Between Closely-Related Languages", Proceedings of the 50th Annual Meeting of the Association for Computational Linguistics, vol. 2, Jan. 1, 2012, pp. 301-305.
Wubben, et al., "Paraphrase Generation as Monolingual Translation: Data and Evaluation", Jul. 7, 2010, pp. 203-207 (Abstract).
Bahdanau, et al., "Neural Machine Translation by Jointly Learning to Align and Translate", Oct. 7, 2014, pp. 1-15, Retrieved from the internet: URL:http://arxiv.org/pdf/1409.0473v3.pdf [retrieved on Jan. 6, 2016].
Hasan, et al., "Neural Clinical Paraphrase Generation with Attention", Proceedings of the Clinical Natural Language Processing Workshop, Dec. 17, 2016, pp. 42-53, Retrieved from the Internet: URL:https://aclweb.0rg/anthology/W/W16/W16-4207.pdf [retrieved on Mar. 15, 2017].
Pavlick, et al., "PPDB 2.0: Better paraphrase ranking, fine-grained entailment relations, word embeddings, and style classification", Proceedings of the 53rd Annual Meeting of the Association for Computational Linguistics and the 7th International Joint Conference on Natural Language Processing, vol. 2, Jan. 1, 2015, pp. 425-430.

* cited by examiner

1. Gates
$$i_t = \sigma(W_{xi}x_t + W_{hi}h_{t-1} + b_i)$$
$$f_t = \sigma(W_{xf}x_t + W_{hf}h_{t-1} + b_f)$$
$$o_t = \sigma(W_{xo}x_t + W_{ho}h_{t-1} + b_o)$$

2. Input transform
$$c\_in_t = \tanh(W_{xc}x_t + W_{hc}h_{t-1} + b_{c\_in})$$

3. State Update
$$c_t = f_t \odot c_{t-1} + i_t \odot c\_in_t$$
$$h_t = o_t \odot \tanh(c_t)$$

SYSTEMS AND METHODS FOR NEURAL CLINICAL PARAPHRASE GENERATION

CROSS-REFERENCE TO PRIOR APPLICATIONS

This application is the U.S. National Phase application under 35 U.S.C. § 371 of International Application No. PCT/IB2017/050325, filed on Jan. 23, 2017, which claims the benefit of U.S. Provisional Application Ser. No. 62/286,989, filed Jan. 26, 2016. These applications are hereby incorporated by reference herein, for all purposes.

BACKGROUND

1. Field

The present disclosure pertains to a paraphrase generation system configured to provide one or more paraphrases of a natural language input.

2. Description of the Related Art

Neural machine translation systems are known. Existing neural machine translation systems typically perform bilingual machine translation via word-level computations using an encoder-decoder approach (e.g., where a fixed-length vector is generated from a source sentence that is used to form a target sentence) or an attention-based soft-search approach (e.g., where the model is capable of learning to align and translate jointly, which helps improve target word prediction in relatively long sentences by using context vectors of the most relevant source words). These approaches are unable to accurately predict a target word given an unknown source word (e.g., a word that is not included in a training dataset for the neural network).

SUMMARY

Accordingly, one or more aspects of the present disclosure relate to a system configured to a paraphrase generation system comprising one or more hardware processors and/or other components. The one or more hardware processors are configured by machine-readable instructions to: obtain a training corpus, the training corpus comprising language and paraphrases of the language; generate, based on the training corpus, a word-level attention-based model and a character-level attention-based model; and provide one or more candidate paraphrases of a natural language input based on both the word-level and character-level attention-based models. In some embodiments, the one or more hardware processors are configured such that the word-level attention-based model is a word-level bidirectional long short term memory (LSTM) network and the character-level attention-based model is a character-level bidirectional LSTM network. The word-level and character level LSTM networks are generated based on words and characters in the training corpus. In some embodiments, the one or more hardware processors are configured to generate a sentence-level attention-based model based on the training corpus and provide the one or more candidate paraphrases of the natural language input based on the sentence-level, word-level, and character-level attention-based models. In some embodiments, the one or more hardware processors are configured to determine word-level, character-level, and sentence-level embeddings using the training corpus; update the word-level, character-level, and sentence-level embeddings based on semantic relationships known from existing knowledge bases; generate the word-level and character-level attention-based models based on the updated word-level and character-level embeddings; and provide the one or more candidate paraphrases based on the word-level and character-level attention-based models, and the updated sentence-level embeddings. In some embodiments, the one or more hardware processors are configured to determine the sentence-level, word-level, and character level embeddings using recurrent neural networks (RNN) and/or convolutional neural networks (CNN). In some embodiments, the one or more hardware processors are configured such that the providing the one or more candidate paraphrases comprises determining a reward function for the reinforcement learning model configured to compare a semantic similarity and novelty of candidate paraphrase word choices to a target sentence, and outputting a candidate paraphrase based on the comparison. In some embodiments, the one or more hardware processors are configured such that the word-level attention-based model is a stacked residual word-level bidirectional LSTM network and the character-level attention-based model is a stacked residual character-level bidirectional LSTM network. The stacked residual LSTM networks comprise residual connections between stacked layers of a given LSTM network.

Another aspect of the present disclosure relates to a method for generating paraphrases with the paraphrase generation system. The method comprises: obtaining a training corpus, the training corpus comprising language and paraphrases of the language; generating, based on the training corpus, a word-level attention-based model and a character-level attention-based model; and providing one or more candidate paraphrases of a natural language input based on both the word-level and character-level attention-based models. In some embodiments, the word-level attention-based model is a word-level bidirectional LSTM network and the character-level attention-based model is a character-level bidirectional LSTM network. The word-level and character level LSTM networks are generated based on words and characters in the training corpus. In some embodiments, the method further comprises generating a sentence-level attention-based model based on the training corpus, and providing the one or more candidate paraphrases of the natural language input based on the sentence-level, word-level, and character-level attention-based models. In some embodiments, the method further comprises determining word-level, character-level, and sentence-level embeddings using the training corpus; updating the word-level, character-level, and sentence-level embeddings based on semantic relationships known from existing knowledge bases; generating the word-level and character-level attention-based models based on the updated word-level and character-level embeddings; and providing the one or more candidate paraphrases based on the word-level and character-level attention-based models, and the updated sentence-level embeddings. In some embodiments, the sentence-level, word-level, and character level embeddings are determined using RNN and/or CNN. In some embodiments, providing the one or more candidate paraphrases comprises determining a reward function reinforcement learning model configured to compare a semantic similarity and novelty of candidate paraphrase word choices to a target sentence, and outputting a candidate paraphrase based on the comparison. In some embodiments, the word-level attention-based model is a stacked residual word-level bidirectional LSTM network and the character-level attention-based model is a stacked residual character-level bidirectional LSTM network. The stacked residual LSTM networks comprise residual connections between stacked layers of a given LSTM network.

Still another aspect of present disclosure relates to a system for generating paraphrases. The system comprises: means for obtaining a training corpus, the training corpus comprising language and paraphrases of the language; means for generating, based on the training corpus, a word-level attention-based model and a character-level attention-based model; and means for providing one or more candidate paraphrases of a natural language input based on both the word-level and character-level attention-based models. In some embodiments, the word-level attention-based model is a word-level bidirectional LSTM network and the character-level attention-based model is a character-level bidirectional LSTM network. The word-level and character level LSTM networks are generated based on words and characters in the training corpus. In some embodiments, the system further comprises means for generating a sentence-level attention-based model based on the training corpus, and providing the one or more candidate paraphrases of the natural language input based on the sentence-level, word-level, and character-level attention-based models. In some embodiments, the system further comprises means for determining word-level, character-level, and sentence-level embeddings using the training corpus; means for updating the word-level, character-level, and sentence-level embeddings based on semantic relationships known from existing knowledge bases; means for generating the word-level and character-level attention-based models based on the updated word-level and character-level embeddings; and means for providing the one or more candidate paraphrases based on the word-level and character-level attention-based models, and the updated sentence-level embeddings. In some embodiments, the sentence-level, word-level, and character level embeddings are determined using RNN and/or CNN. In some embodiments, providing the one or more candidate paraphrases comprises determining a reward function reinforcement learning model configured to compare a semantic similarity and novelty of candidate paraphrase word choices to a target sentence, and outputting a candidate paraphrase based on the comparison. In some embodiments, the word-level attention-based model is a stacked residual word-level bidirectional LSTM network and the character-level attention-based model is a stacked residual character-level bidirectional LSTM network. The stacked residual LSTM networks comprise residual connections between stacked layers of a given LSTM network.

These and other objects, features, and characteristics of the present disclosure, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the disclosure.

DETAILED DESCRIPTION OF EXEMPLARY EMBODIMENTS

Figure 1:
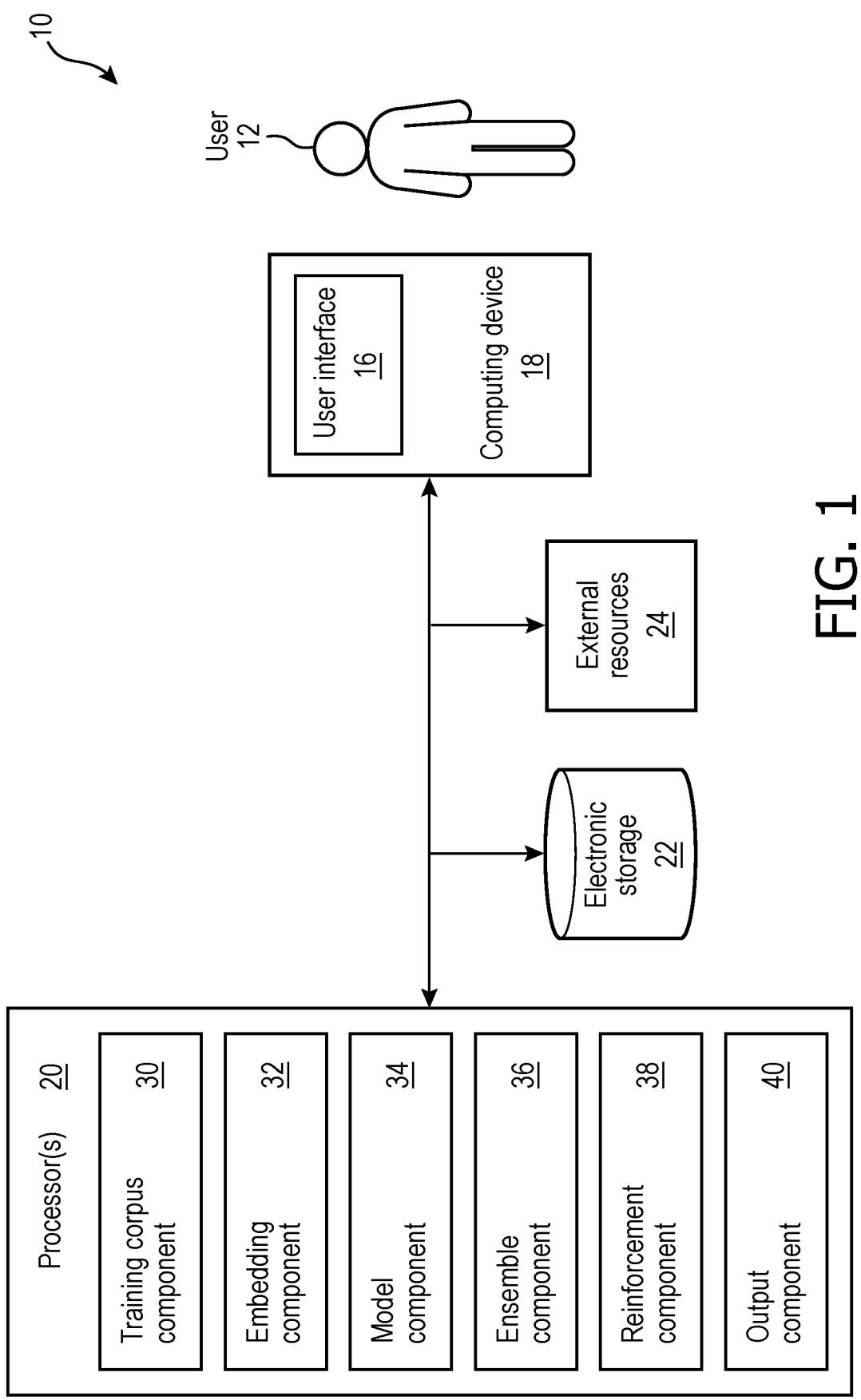
FIG. 1 is a schematic illustration of a paraphrase generation system.

As used herein, the singular form of "a", "an", and "the" include plural references unless the context clearly dictates otherwise. As used herein, the statement that two or more parts or components are "coupled" shall mean that the parts are joined or operate together either directly or indirectly, i.e., through one or more intermediate parts or components, so long as a link occurs. As used herein, "directly coupled" means that two elements are directly in contact with each other. As used herein, "fixedly coupled" or "fixed" means that two components are coupled so as to move as one while maintaining a constant orientation relative to each other.

As used herein, the word "unitary" means a component is created as a single piece or unit. That is, a component that includes pieces that are created separately and then coupled together as a unit is not a "unitary" component or body. As employed herein, the statement that two or more parts or components "engage" one another shall mean that the parts exert a force against one another either directly or through one or more intermediate parts or components. As employed herein, the term "number" shall mean one or an integer greater than one (i.e., a plurality).

Directional phrases used herein, such as, for example and without limitation, top, bottom, left, right, upper, lower, front, back, and derivatives thereof, relate to the orientation of the elements shown in the drawings and are not limiting upon the claims unless expressly recited therein.

FIG. 1 is a schematic illustration of a paraphrase generation system 10. Paraphrasing comprises using textual alternatives to express the same and/or similar meaning expressed by source content. Paraphrasing is used in various Natural Language Processing (NLP) applications such as search summarization, question answering, information extraction, information retrieval, and natural language generation. System 10 facilitates a holistic approach for paraphrase generation (e.g., clinical paraphrase generation) based on a combination of deep neural networks by casting the task of paraphrase generation as a monolingual neural machine translation problem. System 10 is configured to transform a text to improve readability while keeping the overall meaning intact. Clinical paraphrase generation, for example, has value in developing patient-centric clinical decision support (CDS) applications where users are able to understand complex clinical jargon via easier alternative paraphrases, and/or other applications.

Traditional paraphrase generation methods exploit hand-crafted rules, automatically learned complex paraphrase patterns, thesaurus-based or semantic analysis driven natural language generation approaches, and/or leverage statistical machine learning theory. Existing neural machine translation systems perform bilingual machine translation via word-level computations using an encoder-decoder approach (e.g., where a fixed-length vector is generated from a source sentence that is used to form a target sentence), or an attention-based soft-search approach (e.g., where the model is capable of learning to align and translate jointly, which helps improve target word prediction in relatively long sentences by using context vectors of the most relevant source words). However, these approaches are limited in their ability to predict a target word given an unknown source word (e.g., a word that is not included in a training dataset for the neural network).

System 10 is a deep neural network configured for clinical and/or other paraphrase generation that overcomes the limitations of the traditional approaches to neural machine translation. System 10 is configured to overcome the limitations of prior systems by performing character-level modeling and/or other operations to paraphrase unknown (e.g., words not included in a training database and/or other words) source words. In some embodiments, system 10 combines Convolutional Neural Networks (CNN), Recurrent Neural Networks (RNN), Long Short-Term Memory (LSTM) Networks, and reinforcement learning operations to form ensemble architecture for paraphrase generation. In some embodiments, system 10 includes multiple stacked LSTM networks having residual connections between layers.

The present specification often refers to "clinical" paraphrase generation. This is not intended to be limiting. System 10 may generate paraphrases as described herein for clinical, non-clinical, and/or other applications. Clinical paraphrase generation is used as a convenient example because there are a wide range of different types and styles of clinical documentation. Such documentation is often verbose in its description, and often a busy caregiver and/or other user 12 (e.g., clinician, doctor, nurse, care facility staff, family member, friend, etc.) would prefer a paraphrased overview of information conveyed by such documentation (e.g., presented in a user interface 16 of a computing device 18 associated with user 12). Such documentation also often includes words not previously encountered by the paraphrase generation system (e.g., "unknown" words as described above). A specific user 12 may only be interested in a fraction of the information conveyed in a report, for example, as a reminder during a medical intervention, treatment planning, and/or at other times. Using clinical paraphrase generation as an example, system 10 is configured to paraphrase language in clinical documents such that a user 12 may quickly come up to speed with the latest information relevant to a particular patient.

In some embodiments, system 10 comprises a computing device 18 (including user interface 16), one or more processors 20, electronic storage 22, external resources 24, and/or other components.

Computing device 18 is configured to provide an interface between a user 12 and system 10. Computing device 18 is configured to provide information to and/or receive information from user 12 and/or other users. Computing device 18 includes a user interface 16 and/or other components. User interface 16 is configured to receive entry and/or selection of information from user 12. User interface 16 is configured to present user 12 and/or other users with the generated paraphrases. In some embodiments, user interface 16 includes a plurality of separate interfaces associated with computing device 18, processor 20 and/or other components of system 10, for example. In some embodiments, system 10 comprises a plurality of computing devices 18 associated with a plurality of users 12.

In some embodiments, a given computing device 18 is configured to provide user interface 16, processing capabilities, databases, and/or electronic storage to system 10. As such, computing device 18 may include processors 20, electronic storage 22, external resources 24, and/or other components of system 10. In some embodiments, computing device 18 is connected to a network (e.g., the internet). In some embodiments, computing device 18 does not include processor 20, electronic storage 22, external resources 24, and/or other components of system 10, but instead communicates with these components via the network. For example, processor 20, electronic storage 22, and external resources 24, and/or other components of system 10 may be located in a "public cloud" or "private cloud" (hereinafter "cloud"). In some embodiments, computing device 18 is, for example, a dumb device that receives information stored and processed in the public or private cloud. The connection to the network may be wireless or wired. For example, processor 20 may be located in a remote server and may generate and wirelessly cause display of the paraphrases via user interface 16 to user 12 on computing device 18. In some embodiments, computing device 18 is a laptop, a desktop computer, a smartphone, a tablet computer, and/or other computing devices.

Examples of interface devices suitable for inclusion in user interface 16 include a touch screen, a keypad, touch sensitive and/or physical buttons, switches, a keyboard, knobs, levers, a display, speakers, a microphone, an indicator light, an audible alarm, a printer, and/or other interface devices. The present disclosure also contemplates that computing device 18 includes a removable storage interface. In this example, information may be loaded into computing device 18 from removable storage (e.g., a smart card, a flash drive, a removable disk) that enables user 12 and/or other users to customize the implementation of computing device 18. Other exemplary input devices and techniques adapted for use with computing device 18 and/or user interface 16 include, but are not limited to, an RS-232 port, RF link, an IR link, a modem (telephone, cable, etc.) and/or other devices.

Processor 20 is configured to provide information processing capabilities (e.g. using a standard Graphics Processing Unit (GPU) and/or other components) in system 10. As such, processor 20 may comprise one or more of a digital processor, an analog processor, a digital circuit designed to process information, an analog circuit designed to process information, a state machine, and/or other mechanisms for electronically processing information. Although processor 20 is shown in FIG. 1 as a single entity, this is for illustrative purposes only. In some embodiments, processor 20 may comprise a plurality of processing units. These processing units may be physically located within the same device (e.g., a server), or processor 20 may represent processing functionality of a plurality of devices operating in coordination (e.g., one or more servers, computing device 18, devices that are part of external resources 24, electronic storage 22, and/or other devices.)

In some embodiments, processor 20, external resources 24, computing device 18, electronic storage 22, and/or other components may be operatively linked via one or more electronic communication links. For example, such electronic communication links may be established, at least in part, via a network such as the Internet, and/or other networks. It will be appreciated that this is not intended to be limiting, and that the scope of this disclosure includes embodiments in which these components may be operatively linked via some other communication media. In some embodiments, processor 20 is configured to communicate with external resources 24, computing device 18, electronic storage 22, and/or other components according to a client/server architecture, a peer-to-peer architecture, and/or other architectures.

As shown in FIG. 1, processor 20 is configured via machine-readable instructions to execute one or more computer program components. The one or more computer program components may comprise one or more of a training corpus component 30, an embedding generation component 32, a model component 34, an ensemble learning component 36, a reinforcement learning component 38, an output component 40, and/or other components. Processor 20 may be configured to execute components 30, 32, 34, 36, 38, and/or 40 by software; hardware; firmware; some combination of software, hardware, and/or firmware; and/or other mechanisms for configuring processing capabilities on processor 20.

It should be appreciated that although components 30, 32, 34, 36, 38, and 40 are illustrated in FIG. 1 as being co-located within a single processing unit, in embodiments in which processor 20 comprises multiple processing units, one or more of components 30, 32, 34, 36, 38, and/or 40 may be located remotely from the other components. The description of the functionality provided by the different components 30, 32, 34, 36, 38, and/or 40 described below is for illustrative purposes, and is not intended to be limiting, as any of components 30, 32, 34, 36, 38, and/or 40 may provide more or less functionality than is described. For example, one or more of components 30, 32, 34, 36, 38, and/or 40 may be eliminated, and some or all of its functionality may be provided by other components 30, 32, 34, 36, 38, and/or 40. As another example, processor 20 may be configured to execute one or more additional components that may perform some or all of the functionality attributed below to one of components 30, 32, 34, 36, 38, and/or 40.

Training corpus component 30 is configured to obtain a training corpus. The training corpus comprises language, paraphrases of the language, and/or other information. The language is formed by individual sentences, phrases, words, characters (e.g., letters) and/or other components arranged in a specific manner (e.g., as a medical report, medical record, etc.) by an author. The paraphrases are characters, words, and/or other notations that correspond to the language (e.g., medical report, medical record, etc.) and communicate the same and/or similar information to that communicated by the language, but in a shortened and/or abbreviated way. For example, the training corpus may include clinical language (e.g., sentences, phrases, words, characters, etc.) and known paraphrases that correspond to the clinical language in a predetermined manner.

In some embodiments, training corpus component 30 is configured such that the training corpus is determined based on clinical and/or non-clinical language, data, and/or other information. Non-clinical language, data, and/or information may be obtained from non-clinical publicly available paraphrase databases (e.g. paraphrase.org, etc.) and/or other sources. Clinical language, data, and/or other information may be obtained from open-source clinical ontologies (e.g., the collection of unique specified names and corresponding synonyms for clinical concepts in SNOMED CT) and/or other sources. Information sources like these may be included in external resources 24, for example. Training corpus component 30 is configured such that the non-clinical and/or clinical language, data, and/or other information are combined to generate a training corpus having source language and known corresponding paraphrases (e.g., in an individual language such as English such that the task of paraphrase generation is cast as a monolingual translation problem.) Training corpus component 30 is configured such that obtaining the training corpus further comprises preprocessing the corpus by performing tokenization and vocabulary generation. For example, unique words available in the corpus are indexed in an appropriate data structure (e.g., for later determination of word-level information); and unique characters are similarly indexed (e.g., for later use in determination of character-level information).

Embedding component 32 is configured to determine word-level, character-level, and sentence-level embeddings using the training corpus, and update the word-level, character-level, and sentence-level embeddings based on semantic relationships known from existing knowledge bases. In some embodiments, the sentence-level, word-level, and character level embeddings are determined using RNN and/or CNN.

Figure 2:
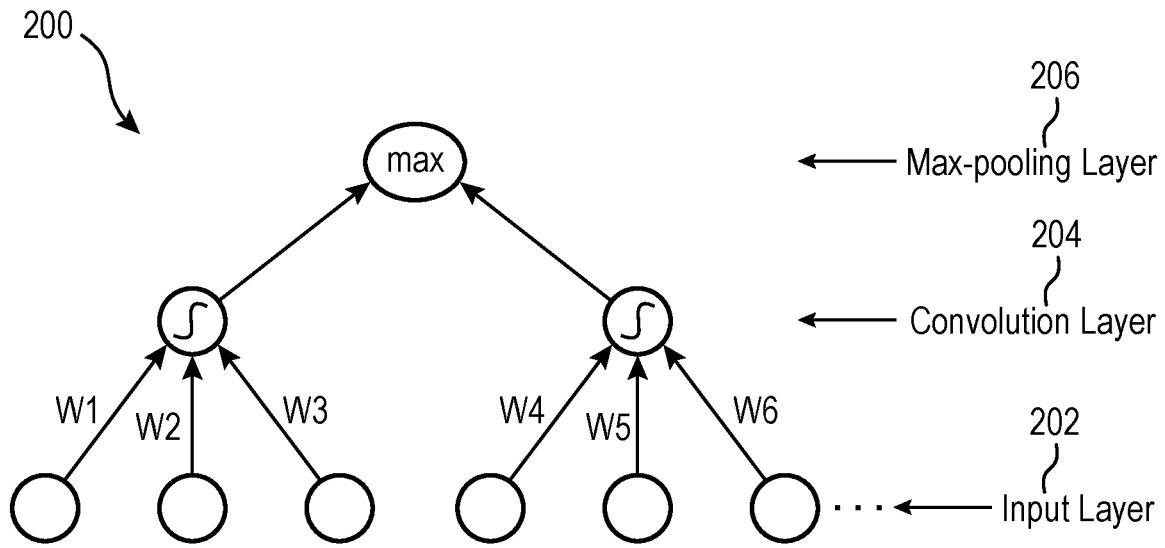
FIG. 2 illustrates multi-layer CNN architecture.
Figure 3:
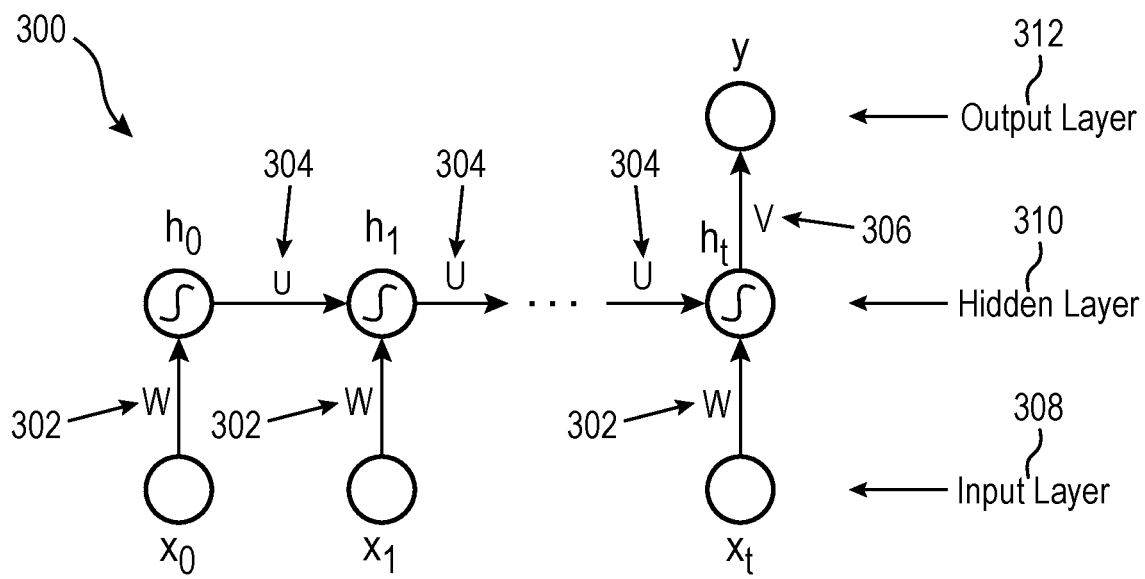
FIG. 3 illustrates multi-layer RNN architecture.

As shown in FIG. 2 (CNN) and FIG. 3 (RNN) multi-layer CNN and/or RNN architectures 200 and 300 (respectively) are used to perform unsupervised pre-training of the training corpus to learn the embeddings. CNN is a type of feed-forward artificial neural network where the individual neurons are tiled with overlaps, such that individual neurons are connected to/activated by not the whole, but part of the input sentence, allowing the creation of locally connected networks to enable weight sharing via temporal convolutions. As shown in FIG. 2, CNNs include an input layer 202, a convolution layer 204, and a max-pooling layer 206. Max-pooling layer 206 determines the max value of a selected set of output neurons from convolution layer 204 to be used as inputs to higher layers. Thus, convolution 204 and max-pooling 206 layers help reduce the computational complexity of the overall network by shrinking the parameter space and providing a form of translational invariance. In some embodiments, translational invariance may be a limitation to NLP problems because of the application of large max-pooling towards variable-sized input sentences (whereas sequence/ordering may need to be preserved). In FIG. 2, weights (W) W1 and W4 are shared, W2 and W5 are shared, and W3 and W6 are shared.

As shown in FIG. 3, RNNs may resolve such sequence prediction problems as they typically possess three sets of shared parameters across the network: input to hidden weights (W) 302, hidden to hidden weights (U) 304, and hidden to output weights (V) 306. This weight sharing property allows RNNs to be suitable for variable-sized inputs in NLP problems. (As shown in FIG. 3, RNNs include an input layer 308, a hidden layer 310, and an output layer 312.) In FIG. 3, $X_{0,1,\ldots,t}$ refer to the input word/character at time, t; $h_{0,1,\ldots,t}$ refer to the corresponding hidden state at time, t; and y denotes the output. In some embodiments, embedding component 32 is configured such that the RNN is a bidirectional RNN. Bidirectional RNNs are based on the assumption that an output at time t may not only depend on the previous elements in a sequence, but also future elements. For example, to predict a missing word/character in a sequence it may be necessary to consider both context to the left of the missing word in the sequence and context to the right of the missing word in the sequence. Thus, the bidirectional RNN architecture follows an RNN encoder-decoder approach where two RNNs are used to encode a source sentence in order to capture the contextual properties of the words in a sentence in both forward and backward directions; and then one RNN is used as a decoder to generate a target sentence. In some embodiments, the bidirectional RNN architecture is fed with an input source sentence sequence multiple times. The term "attention" in the attention-based model stands for giving emphasis (i.e. putting attention) to certain source words during the decoding process. The attention-based decoding mechanism allows the model to search for the most relevant source words while predicting the next target word, which alleviates issues related to long-range dependencies in relatively long sentences.

In some embodiments, the learned embeddings (the output of the CNN and/or RNN) comprise vectors representing contextual information associated with sentences, words, characters of the language in the training corpus and/or other information. In some embodiments, embedding component 32 is configured to update the learned embeddings using semantic relationships obtained from existing knowledge bases (e.g. Wikipedia, PubMed articles, etc. included in external resources 24 shown in FIG. 1). The updated word and character-level embeddings are used to initialize the attention-based word-level and char-level bidirectional LSTM networks, respectively (e.g., as described below).

In some embodiments, the CNN and/or RNN architecture comprises a multi-layer highway network characterized by substantially unimpeded information flow across several layers on "information highways". Highway networks with hundreds of layers may be trained directly using stochastic gradient descent, opening up the possibility of studying extremely deep and efficient architectures. For example, the concept of highway networks can allow more layers in the architectures shown in FIG. 2 and FIG. 3 by allowing direct connections between the neurons in distant layers with a modified gating function, which enables the model to train a very deep neural network to improve the model performance.

Returning to FIG. 1, model component 34 is configured to generate word-level attention-based models, character-level attention-based models, and/or other models. As described above, in some scenarios, word-level models alone likely will not accurately predict a target word (e.g., paraphrase) based on a previously unknown source (input) word. System 10 resolves this issue by determining a character-level model in addition to a word-level model. When using a character-level model, the number of available characters (e.g., letters) used to compose clinical language and/or documentation is finite (unlike the unlimited number of possible words and/or sentences available to an author), thereby facilitating accurate prediction of one or more target words (e.g., by decreasing the set of possible candidate paraphrases, reducing the amount of computational resources required for accurate prediction of the target words, etc.).

Figure 4A:
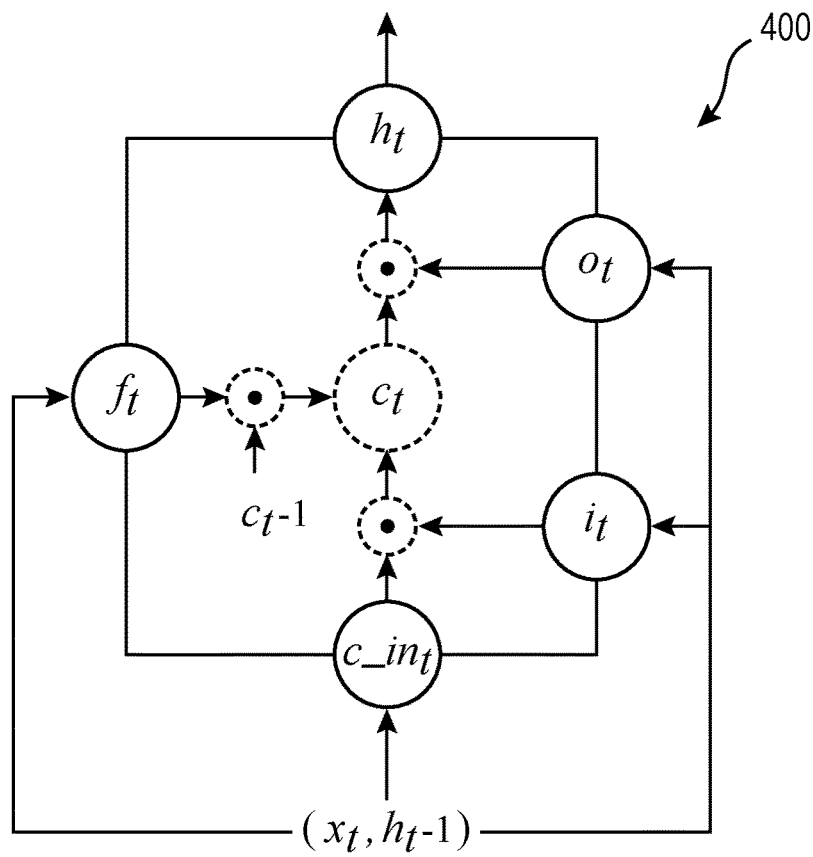
FIG. 4A illustrates an LSTM network.
Figure 4A:

In some embodiments, the word-level attention-based model is a word-level bidirectional LSTM network and the character-level attention-based model is a character-level bidirectional LSTM network. FIG. 4A illustrates a block diagram 400 of an LSTM network and corresponding equations 402 that describe the functionality of an LSTM network. An LSTM network is an RNN which adds an internal memory cell $c_t \in R^n$ at individual time steps. An LSTM network unit takes three inputs $x_t$; $h_{t-1}$; $c_{t-1}$ at individual time steps and produces the hidden state, $h_t$ and the internal memory state, $c_t$ at time step t. The memory cell is controlled via three learned gates: input i, forget f, and output o. These memory cells use the addition of a gradient with respect to time and thus minimize any gradient explosion. In the equations shown in FIG. 4A, $W_x$ and $W_h$ are learned parameters for x and h respectively; $\sigma$ and tan h denote element-wise sigmoid and hyperbolic tangent functions; $\odot$ is the element-wise multiplication operator; and b denotes an added bias.

As described above, in some embodiments, the word-level and character-level LSTM networks are generated based on the updated word-level and/or character-level embeddings. In some embodiments, the word-level and character-level LSTM networks are generated based on the words, characters, and/or other features of the training corpus (e.g., without the need for word and/or character-level embeddings). In such embodiments, the word-level sequence-to-sequence model is a stacked residual word-level bidirectional LSTM network and the character-level sequence-to-sequence model is a stacked residual character-level bidirectional LSTM network. The stacked residual LSTM networks comprise residual connections between stacked layers of a given LSTM network and/or other information.

Figure 4B:
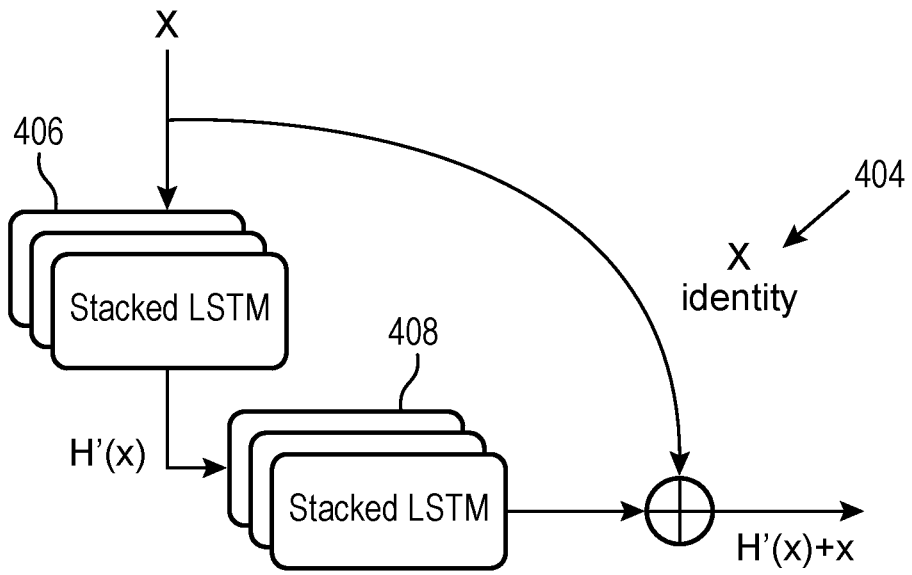
FIG. 4B illustrates a stacked residual bidirectional LSTM network.

FIG. 4B illustrates a stacked residual bidirectional LSTM network. In some embodiments, model component 34 (FIG. 1) is configured such that the word-level and/or character level LSTM networks comprise vertical stacking where an output of a previous layer of an LSTM network is fed as an input to a subsequent layer. In some embodiments, all but a first layer input at time step t is passed from the hidden state of the previous layer $h_{lt}$, where l denotes the layer. Thus, for a layer l the activation is described by:

$$h_t^{(l)} = f_h^l(h_t^{(l-1)}, h_{t-1}^{(l)})$$

where hidden states h are recursively determined and $h_t^{(l)}$ at t=0 and l=0 is given by (e.g., as shown in FIG. 4A):

$$h_t = o^t \odot \tan h(c_t).$$

In some embodiments, as shown in FIG. 4B, addition of a residue x 404 to the function being learned (e.g., stacked LSTM networks 406 and 408) facilitates deeper network training without overfitting the data (in the description of FIG. 4B, H' is used instead of F in order to avoid confusion with the forget gate symbol described above; also, like FIG. 4A, "X" in FIG. 4B denotes the input). It should be noted that it is not necessary to add the residue connection after every stacked layer of an LSTM network. For example, in a four-layer stacked LSTM network (e.g., for either and/or both of the character-level and/or word-level models), residue connections may be added at layer two as a pointwise addition, such that the input is required to be in the same dimension as the output of $h_t$. Model component 34 (FIG. 1) is configured to facilitate a last hidden unit stacking of an LSTM network which allows clipping $h_t$ to match the dimension of $x_{t-2}$ when they are not the same. Similar results may be obtained by padding x to match the dimension. Thus, the function H' that is learned for a layer with a residue connection is given by:

$$H_t'^{(l)} = f_h^l(h_t^{(l-1)}, h_{t-1}^{(l)}) + x_{t-2}$$

Advantageously, the addition of residual connections does not add learnable parameters to increase the complexity of a model.

Returning to FIG. 1, ensemble component 36 is configured to provide one or more candidate paraphrases. The one or more candidate paraphrases are paraphrases of a natural language input. The candidate paraphrases are determined based on both the word-level and character-level attention-based models. In this way, for example, the character-level attention-based model may be used in addition to the word-level attention-based model to overcome one or more potential deficiencies of using a word-level model alone (e.g., to generate accurate paraphrases of previously unknown words). In addition, in some scenarios, the use of a character-level model alone for paraphrase generation may periodically generate an incorrect ordering of characters, thus producing unusual and/or unintelligent words. Ensemble component 36 utilizes an ensemble learning architecture that leverages the strengths of both the word-level and character-level models.

Ensemble component 36 is configured to determine a plurality of candidate paraphrases based on both the word-level LSTM model and the character-LSTM model. In some embodiments, the word-level and character-level models may individually generate two or more sets of candidate paraphrases. For example, word-level and character-level candidate paraphrase determinations may be generated by the models where the model can take word-level/character-level inputs at the input layer and generate word-level/character-level outputs at the prediction/output layer (which combined together comprise four sets of candidate paraphrases). Similarly, multiple approaches (e.g. bidirectional encoder-decoder, attention-based soft-search, stacked residual LSTM networks etc.) for generating the models themselves may be combined to produce multiple learning models from the same training corpus, which may contribute multiple different sets of candidate clinical paraphrases.

In some embodiments, the one or more candidate paraphrases are determined based on the word-level and character-level attention-based models, and the updated sentence-level embeddings. In some embodiments (e.g., such as when the word-level attention-based model is a stacked residual word-level bidirectional LSTM network and the character-level attention-based model is a stacked residual character-level bidirectional LSTM network) the one or more candidate paraphrases are determined based on the training corpus alone, without need for the word and/or character-level embeddings.

Reinforcement component 38 is configured to determine and/or utilize a reward function reinforcement learning model. The reward function reinforcement learning model is configured to compare a semantic similarity and novelty of candidate paraphrase word choices to a target sentence and/or other information. Reinforcement component 38 selects individual candidate paraphrases from the possible paraphrases determined by ensemble component 36 and determines how good the candidate paraphrase is with respect to the target sentence using a reward function. The reward function measures how close the candidate paraphrase is to the source/target sentence context. The reward function can be defined by any sentence similarity function that can measure the similarity between two sentences in terms of meaningfulness, novelty, and grammaticality. The reward for the individual possible paraphrase can be essentially determined based on a comparison of the word choices to the context information conveyed by the sentence embeddings. Reinforcement component 38 is configured such that the paraphrase generated by system 10 is a highest ranked (e.g., based on the comparisons and/or "rewards") one of the candidate paraphrases.

Figure 5:
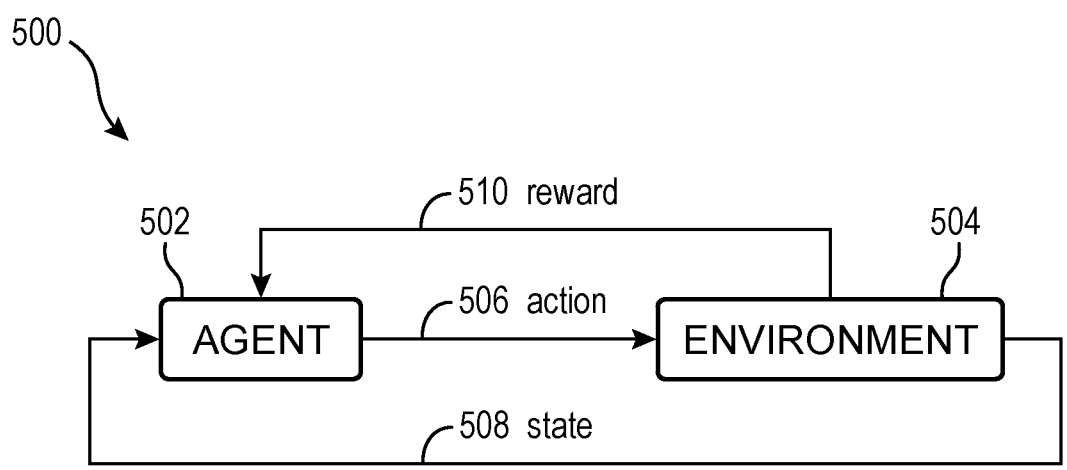
FIG. 5 illustrates a reinforcement learning architecture.

Reinforcement component 38 is configured to use the reinforcement learning architecture shown in FIG. 5. As shown in FIG. 5, in reinforcement learning architecture 500, agent 502 interacts with the environment 504. Responsive to individual actions 506, environment 504 generates a state 508 reward 510 pair, and agent 502 generates subsequent actions based on what it learns from the state 508 reward 510 pair. Reinforcement component 38 and ensemble component 36 are configured such that generating a candidate paraphrase is the 'action' 506 (e.g., with operations performed by ensemble component 36 corresponding to agent 502) and a result of comparing the semantic similarity and novelty of candidate paraphrase word choices to a target sentence corresponding to the state 508 reward 510 pair.

Returning to FIG. 1, output component 40 is configured to output the paraphrase of the natural language input. The output paraphrase may be one of the candidate paraphrases provided by ensemble component 36. The output paraphrase may be determined based on the comparison by reinforcement component 38, the one or more candidate paraphrases determined by ensemble component 36, the word-level and character-level models, and/or other information. Output component may output the paraphrase to computing device 18 for display via user interface 16, store the output paraphrase in electronic storage 22, communicate the output paraphrase to external resources 24 and/or perform other operations.

Figure 6:
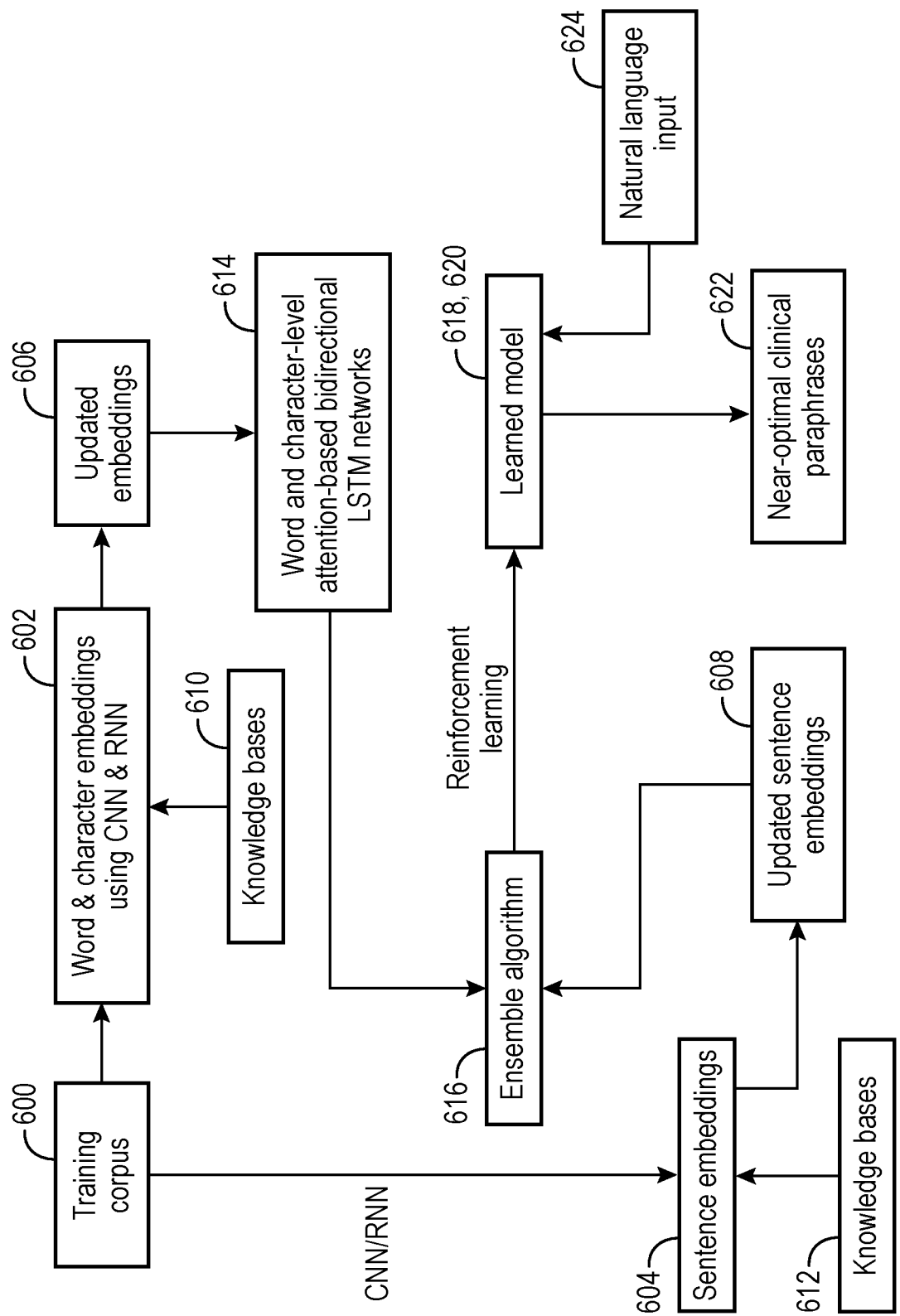
FIG. 6 illustrates a portion of the operations performed by the system.

FIG. 6 summarizes a portion of operations performed by system 10 (shown in FIG. 1). FIG. 6 summarizes operations performed by an embodiment of system 10 wherein the one or more candidate paraphrases are determined based on the word-level and character-level attention-based models, and the updated sentence-level embeddings (in contrast to embodiments wherein the word-level attention-based model is a stacked residual word-level bidirectional LSTM network, the character-level attention-based model is a stacked residual character-level bidirectional LSTM network, and the one or more candidate paraphrases are determined based on the training corpus alone, without need for the word and/or character-level embeddings). For example, as shown in FIG. 6, system 10 (e.g., training corpus component 30 shown in FIG. 1 and described herein) is configured to obtain 600 a training corpus. System 10 (e.g., embedding component 32) is configured to determine 602, 604 word-level, character-level, and sentence-level embeddings using the training corpus. In some embodiments, the sentence-level, word-level, and character level embeddings are determined using RNN and/or CNN. System 10 is configured to update 606, 608 the word-level, character-level, and sentence-level embeddings based on semantic relationships known from existing knowledge bases 610, 612. System 10 (e.g., model component 34) is configured to generate 614 the word-level and character-level attention-based models. In some embodiments, the word-level attention-based model is a word-level bidirectional LSTM network and the character-level attention-based model is a character-level bidirectional LSTM network. The word-level and character-level LSTM networks are generated based on the updated word-level and character-level embeddings, and/or other information. System 10 (e.g., ensemble component 36) is configured to provide 616 candidate paraphrases. In the embodiment, shown in FIG. 6, system 10 (e.g., ensemble component 36) is configured such that the one or more candidate paraphrases are determined based on the word-level and character-level attention-based models, the updated sentence-level embeddings, and/or other information. System 10 (e.g., reinforcement component 38 and/or output component 40) is configured to determine 618 a reward function reinforcement learning model configured to compare 620 a semantic similarity and novelty of candidate paraphrase word choices to a target sentence, and output 622 a candidate paraphrase of a natural language input 624 based on the comparison.

Returning to FIG. 1, electronic storage 22 comprises electronic storage media that electronically stores information. The electronic storage media of electronic storage 22 may comprise one or both of system storage that is provided integrally (i.e., substantially non-removable) with system 10 and/or removable storage that is removably connectable to system 10 via, for example, a port (e.g., a USB port, a firewire port, etc.) or a drive (e.g., a disk drive, etc.). Electronic storage 22 may be (in whole or in part) a separate component within system 10, or electronic storage 22 may be provided (in whole or in part) integrally with one or more other components of system 10 (e.g., computing device 18, processor 20, etc.). In some embodiments, electronic storage 22 may be located in a server together with processor 20, in a server that is part of external resources 24, in computing device 18 associated with subject 12, and/or in other locations. Electronic storage 22 may comprise one or more of optically readable storage media (e.g., optical disks, etc.), magnetically readable storage media (e.g., magnetic tape, magnetic hard drive, floppy drive, etc.), electrical charge-based storage media (e.g., EPROM, RAM, etc.), solid-state storage media (e.g., flash drive, etc.), and/or other electronically readable storage media. Electronic storage 22 may store software algorithms, information determined by processor 20 (e.g., candidate paraphrases), information received via computing device 18 and/or user interface 16 and/or other external computing systems, information received from external resources 24, and/or other information that enables system 10 to function as described herein.

External resources 24 include sources of information (e.g., databases; websites; the training corpus sources such as paraphrase.org, SNOMED CT, etc.; the existing knowledge bases used by embedding component 32 to update the word-level, character-level, and sentence-level embeddings; etc.), external entities participating with system 10 (e.g., an electronic database system of a health care provider that stores clinical records which may be paraphrased by system 10), one or more servers outside of system 10, a network (e.g., the internet), electronic storage, equipment related to Wi-Fi technology, equipment related to Bluetooth® technology, data entry devices, sensors, scanners, and/or other resources. In some implementations, some or all of the functionality attributed herein to external resources 24 may be provided by resources included in system 10. External resources 24 may be configured to communicate with processor 20, computing device 18, electronic storage 22, and/or other components of system 10 via wired and/or wireless connections, via a network (e.g., a local area network and/or the internet), via cellular technology, via Wi-Fi technology, and/or via other resources.

Figure 7:
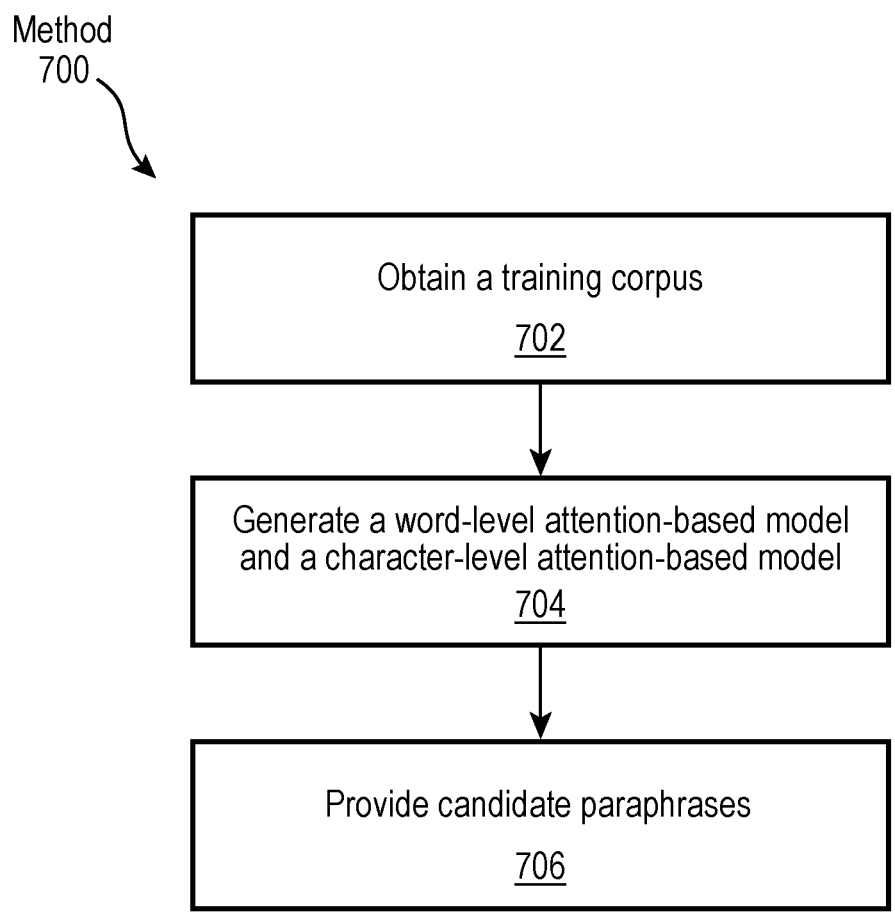
FIG. 7 illustrates a method of generating paraphrases with a paraphrase generation system.

FIG. 7 illustrates a method 700 for generating paraphrases with a paraphrase generation system. The system comprises a computing device including one or more hardware processors and/or other components. The one or more hardware processors are configured by machine readable instructions to execute computer program components. The computer program components include a training corpus component, an embedding component, a model component, an ensemble component, a reinforcement component, an output component, and/or other components. The operations of method 700 presented below are intended to be illustrative. In some embodiments, method 700 may be accomplished with one or more additional operations not described, and/or without one or more of the operations discussed. Additionally, the order in which the operations of method 700 are illustrated in FIG. 7 and described below is not intended to be limiting.

In some embodiments, method 700 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of method 700 in response to instructions stored electronically on an electronic storage medium. The one or more processing devices may include one or more devices configured through hardware, firmware, and/or software to be specifically designed for execution of one or more of the operations of method 700.

At an operation 702, a training corpus is obtained. The training corpus comprises language, paraphrases of the language, and/or other information. The language is formed by individual sentences, phrases, words, characters (e.g., letters) and/or other components arranged in a specific manner (e.g., as a medical report, medical record, etc.) by an author. The paraphrases are characters, words, and/or other notations that correspond to the language (e.g., medical report, medical record, etc.) and communicate the same and/or similar information to that communicated by the language, but in a shortened and/or abbreviated way. For example, the training corpus may include clinical language (e.g., sentences, phrases, words, characters, etc.) and known paraphrases that correspond to the clinical language in a predetermined manner. In some embodiments, operation 702 is performed by a processor component the same as or similar to training corpus component 30 (shown in FIG. 1 and described herein).

At an operation 704, word-level and character-level attention-based models are generated. In some embodiments, the word-level attention-based model is a word-level bidirectional LSTM network and the character-level attention-based model is a character-level bidirectional LSTM network. The word-level and character-level LSTM networks are generated based on the words, characters, and/or other features of the training corpus. In some embodiments, the word-level attention-based model is a stacked residual word-level bidirectional LSTM network and the character-level attention-based model is a stacked residual character-level bidirectional LSTM network. The stacked residual LSTM networks comprise residual connections between stacked layers of a given LSTM network and/or other information.

In some embodiments, operation 704 includes determining word-level, character-level, and sentence-level embeddings using the training corpus; updating the word-level, character-level, and sentence-level embeddings based on semantic relationships known from existing knowledge bases; and generating the word-level and character-level attention-based models based on the updated word-level and character-level embeddings. In some embodiments, the sentence-level, word-level, and character level embeddings are determined using RNN and/or CNN. In some embodiments, operation 704 is performed by processor components the same as or similar to embedding component 32 and/or model component 34 (shown in FIG. 1 and described herein).

At an operation 706, candidate paraphrases are provided. The one or more candidate paraphrases are paraphrases of a natural language input. The candidate paraphrases are determined based on both the word-level and character-level attention-based models. In some embodiments, the one or more candidate paraphrases are determined based on the word-level and character-level attention-based models, and the updated sentence-level embeddings. In some embodiments, providing the one or more candidate paraphrases comprises determining a reward function reinforcement learning model configured to compare a semantic similarity and novelty of candidate paraphrase word choices to a target sentence, and outputting a candidate paraphrase based on the comparison. In some embodiments, operation 706 is performed by processor components the same as or similar to ensemble component 36, reinforcement component 38, and/or output component 40 (shown in FIG. 1 and described herein).

Although the description provided above provides detail for the purpose of illustration based on what is currently considered to be the most practical and preferred embodiments, it is to be understood that such detail is solely for that purpose and that the disclosure is not limited to the expressly disclosed embodiments, but, on the contrary, is intended to cover modifications and equivalent arrangements that are within the spirit and scope of the appended claims. For example, it is to be understood that the present disclosure contemplates that, to the extent possible, one or more features of any embodiment can be combined with one or more features of any other embodiment.

In the claims, any reference signs placed between parentheses shall not be construed as limiting the claim. The word "comprising" or "including" does not exclude the presence of elements or steps other than those listed in a claim. In a device claim enumerating several means, several of these means may be embodied by one and the same item of hardware. The word "a" or "an" preceding an element does not exclude the presence of a plurality of such elements. In any device claim enumerating several means, several of these means may be embodied by one and the same item of hardware. The mere fact that certain elements are recited in mutually different dependent claims does not indicate that these elements cannot be used in combination

What is claimed is:

1. A paraphrase generation system comprising one or more hardware processors configured by machine-readable instructions to:
    obtain a training corpus, the training corpus comprising language and paraphrases of the language;
    determine word-level and character-level embeddings using the training corpus;
    update the word-level and character-level embeddings based on semantic relationships known from existing knowledge bases;
    generate, based on the training corpus and the word-level and character-level embeddings, a word-level attention-based model and a character-level attention-based model; and
    provide one or more candidate paraphrases of a natural language input based on both the word-level and character-level attention-based models.

2. The system of claim 1, wherein the one or more hardware processors are configured such that the word-level attention-based model is a word-level bidirectional long short term memory (LSTM) network and the character-level attention-based model is a character-level bidirectional LSTM network, and wherein the word-level and character level LSTM networks are generated based on words and characters in the training corpus.

3. The system of claim 1, wherein the one or more hardware processors are configured to generate a sentence-level attention-based model based on the training corpus, wherein the one or more hardware processors are configured to provide the one or more candidate paraphrases of the natural language input based on the sentence-level, word-level, and character-level attention-based models.

4. The system of claim 1, wherein the one or more hardware processors are further configured to determine a sentence-level embedding using the training corpus; update the sentence-level embedding based on semantic relationships known from existing knowledge bases; and provide the one or more candidate paraphrases further based on the sentence-level embedding.

5. The system of claim 4, wherein the one or more hardware processors are configured to determine the sentence-level, word-level, and character level embeddings using recurrent neural networks (RNN) and/or convolutional neural networks (CNN).

6. The system of claim 1, wherein the one or more hardware processors are configured such that the providing the one or more candidate paraphrases comprises determining a reward function reinforcement learning model configured to compare a semantic similarity and novelty of candidate paraphrase word choices to a target sentence, and outputting a candidate paraphrase based on the comparison.

7. The system of claim 1, wherein the one or more hardware processors are configured such that the word-level attention-based model is a stacked residual word-level bidirectional long short term memory (LSTM) network and the character-level attention-based model is a stacked residual character-level bidirectional LSTM network, the stacked residual LSTM networks comprising residual connections between stacked layers of a given LSTM network.

8. A method for generating paraphrases with a paraphrase generation system, the system comprising one or more hardware processors configured by machine-readable instructions, the method comprising:
    obtaining a training corpus, the training corpus comprising language and paraphrases of the language;
    determining word-level and character-level embeddings based on semantic relationships known from existing knowledge bases;
    updating the word-level and character-level embeddings based on semantic relationships known from existing knowledge bases;
    generating, based on the training corpus and on the updated word-level and character-level embeddings, a word-level attention-based model and a character-level attention-based model; and
    providing one or more candidate paraphrases of a natural language input based on both the word-level and character-level attention-based models.

9. The method of claim 8, wherein the word-level attention-based model is a word-level bidirectional long short term memory (LSTM) network and the character-level attention-based model is a character-level bidirectional LSTM network, and wherein the word-level and character level LSTM networks are generated based on words and characters in the training corpus.

10. The method of claim 8, further comprising generating a sentence-level attention-based model based on the training corpus, and providing the one or more candidate paraphrases of the natural language input based on the sentence-level, word-level, and character-level attention-based models.

11. The method of claim 8, further comprising determining a sentence-level embedding using the training corpus; updating the sentence-level embeddings based on semantic relationships known from existing knowledge bases; and providing the one or more candidate paraphrases based on the updated sentence-level embedding.

12. The method of claim 11, wherein the sentence-level, word-level, and character level embeddings are determined using recurrent neural networks (RNN) and/or convolutional neural networks (CNN).

13. The method of claim 8, wherein providing the one or more candidate paraphrases comprises determining a reward function reinforcement learning model configured to compare a semantic similarity and novelty of candidate paraphrase word choices to a target sentence, and outputting a candidate paraphrase based on the comparison.

14. The method of claim 8, wherein the word-level attention-based model is a stacked residual word-level bidirectional long short term memory (LSTM) network and the character-level attention-based model is a stacked residual character-level bidirectional LSTM network, the stacked residual LSTM networks comprising residual connections between stacked layers of a given LSTM network.

15. A system for generating paraphrases, the system comprising:
  means for obtaining a training corpus, the training corpus comprising language and paraphrases of the language;
  means for determining word-level and character-level embeddings using the training corpus;
  means for updating the word-level and character-level embeddings based on semantic relationships known from existing knowledge bases;
  means for generating, based on the training corpus and the updated word-level and character-level embeddings, a word-level attention-based model and a character-level attention-based model; and
  means for providing one or more candidate paraphrases of a natural language input based on both the word-level and character-level attention-based models.

16. The system of claim 15, wherein the word-level attention-based model is a word-level bidirectional long short term memory (LSTM) network and the character-level attention based model is a character-level bidirectional LSTM network, and wherein the word-level and character level LSTM networks are generated based on words and characters in the training corpus.

17. The system of claim 15, further comprising means for generating a sentence-level attention-based model based on the training corpus, and providing the one or more candidate paraphrases of the natural language input based on the sentence-level, word-level, and character-level attention-based models.

18. The system of claim 15, further comprising means for determining sentence-level embeddings using the training corpus; means for updating sentence-level embeddings based on semantic relationships known from existing knowledge bases; and means for providing the one or more candidate paraphrases based on the updated sentence-level embeddings.

19. The system of claim 18, wherein the sentence-level, word-level, and character level embeddings are determined using recurrent neural networks (RNN) and/or convolutional neural networks (CNN).

20. The system of claim 15, wherein providing the one or more candidate paraphrases comprises determining a reward function reinforcement learning model configured to compare a semantic similarity and novelty of candidate paraphrase word choices to a target sentence, and outputting a candidate paraphrase based on the comparison.

21. The system of claim 15, wherein the word-level attention-based model is a stacked residual word-level bidirectional long short term memory (LSTM) network and the character-level attention-based model is a stacked residual character-level bidirectional LSTM network, the stacked residual LSTM networks comprising residual connections between stacked layers of a given LSTM network.

* * * * *